United States Patent [19]

Davis

[11] Patent Number: 5,174,892
[45] Date of Patent: Dec. 29, 1992

[54] PERMANENT FUEL FILTER

[75] Inventor: Leland L. Davis, Saline, Mich.

[73] Assignee: Daco Manufacturing Corporation, Saline, Mich.

[21] Appl. No.: 348,421

[22] Filed: May 8, 1989

[51] Int. Cl.⁵ .......................................... B01D 35/02
[52] U.S. Cl. .................................. 210/131; 210/172; 210/223; 210/257.1; 210/258; 210/299; 210/312; 210/416.4; 210/495; 137/550
[58] Field of Search .............................. 210/130–132, 210/172, 299, 300, 310–312, 416.4, 536, 532.1, 801, 222, 538, 356, 451, 445, 495, 257.1, 258, 251, 303, 223, 248, DIG. 5; 123/538, 557; 137/512.1, 512.15, 852, 550; 335/305

[56] References Cited

U.S. PATENT DOCUMENTS

| 84,081 | 11/1865 | Blanding | 210/312 |
|---|---|---|---|
| 1,424,197 | 8/1922 | Gebhard | 210/303 |
| 2,326,691 | 8/1943 | Schum | 210/311 |
| 2,580,696 | 1/1952 | Novak | 210/532.1 |
| 3,182,800 | 5/1965 | Kasten et al. | 210/96.1 |
| 3,186,551 | 6/1965 | Dornauf | 210/315 |
| 3,372,807 | 3/1968 | Barnard | 210/223 |
| 3,931,011 | 1/1976 | Richards et al. | 210/136 |
| 4,368,716 | 1/1983 | Davis | 210/184 |
| 4,395,996 | 8/1983 | Davis | 210/186 |
| 4,421,090 | 12/1983 | Davis | 210/186 |
| 4,428,351 | 1/1984 | Davis | 210/184 |
| 4,495,069 | 1/1985 | Davis | 210/184 |
| 4,529,517 | 7/1985 | Bertil | 210/223 |
| 4,539,109 | 9/1985 | Davis | 210/184 |
| 4,579,653 | 4/1986 | Davis | 210/184 |
| 4,629,558 | 12/1986 | Garritty | 210/223 |
| 4,680,110 | 7/1987 | Davis | 210/184 |

Primary Examiner—Robert A. Dawson
Assistant Examiner—Matthew O. Savage
Attorney, Agent, or Firm—Basile and Hanlon

[57] ABSTRACT

A primary filter for the fuel supply circuit of a combustion device such as a motor vehicle engine which removes particulates and other contaminants from the fuel prior to being passed through a transfer pump. The primary filter of this invention replaces conventional primary filters having replaceable filter elements thereby reducing maintenance requirements. The primary filter includes a generally horizontally extending elongated cylindrical passage having an enlarged cross-sectional area compared to the inlet port, thus causing the fuel velocity to decrease and permitting heavy particulates and contaminants to settle out. Fuel is removed from the top of the primary filter which causes the fuel to undergo a change in direction which further enhances the contaminant separation effect. Contaminants are collected from the lower portion of the primary filter in a collection bowl or remotely located collection tank. Magnetic particles are removed from the fuel using a permanent magnet or electromagnet. A coarse particulate filter can also be provided with an automatic bypass feature to permit paraffin globules to be transmitted through the filter, thus preventing fuel starvation which can be caused by such deposits.

5 Claims, 2 Drawing Sheets

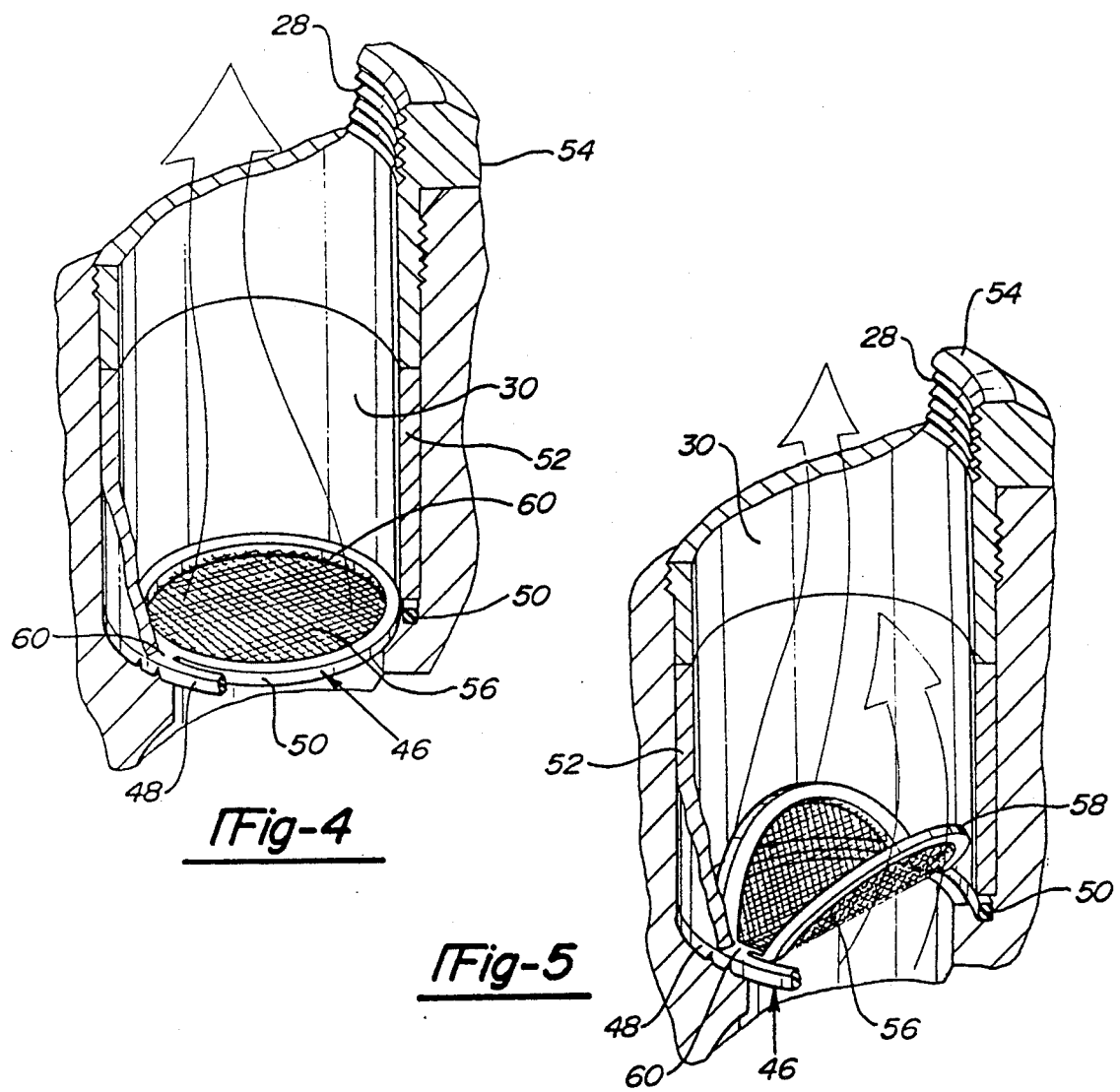
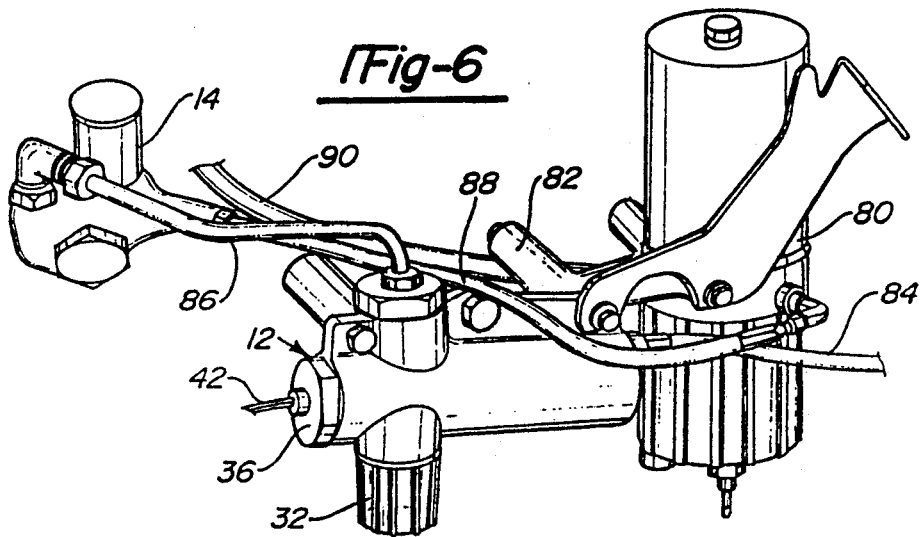

PERMANENT FUEL FILTER

BACKGROUND AND SUMMARY OF THE INVENTION

This invention relates to a filtration device and particularly to one adapted for use in the fuel supply circuit of a motor vehicle.

Motor vehicles such as diesel powered heavy duty trucks typically have a fuel supply system in which fuel is drawn from one or more tanks by a transfer pump and is then sent to the fuel injection pump of the engine. Since fuel injection pumps are very sensitive to contaminants such as water and large particulates, it is necessary to filter the fuel before it is transmitted to the injection pump. In many applications, a pair of particulate filters in series are used. A first filter, referred to in the industry as a "primary filter", filters the fuel flowing between the fuel tank and the transfer pump (fuel pump) as a means of protecting the transfer pump. Since transfer pumps are typically positive displacement types, large particulates can cause damage or premature wear of the pump. Complete failure of the pump could cause the motor vehicle to stop running. After the transfer pump, the fuel is again filtered before flowing to the fuel injection pump. For operation in cold weather conditions and as a means of separating water from the fuel, a fuel heating and/or a water separating device is often provided to treat the fuel before it is sent to the fuel injection pump. Such devices can be placed in the fuel circuit before the transfer pump (vacuum side) or after the transfer pump (pressure side). The assignee of this invention, the Davco Manufacturing Corporation, owns a number of patents relating to devices which perform both the fuel heating and water separating functions in one unit, including U.S. Pat. Nos. 4,368,716, 4,428,351, 4,395,996, 4,421,090, 4,495,069, 4,539,109, 4,680,110, 4,579,653, as well as a number of patent applications currently pending. Many of the devices described in these patents further incorporate particulate filters, thus providing fuel that is warm, clean and substantially water free.

Although dual filtration systems as described previously generally perform adequately, they have several significant drawbacks. Since the primary filter typically has a removable and disposable filter element, it must be serviced frequently and replaced with a new filter, thus contributing to maintenance costs. In addition, in cold weather operating conditions where fuel clouding and waxing can occur, the filter media element of the primary filter can become completely coated with wax deposits, thus creating a flow restriction which can starve the engine. Furthermore, free water often present in fuel which may collect in the primary filter cannot be conveniently drained and is therefore subject to freezing, and can contaminate the filter element.

This invention is directed to a primary filter which does not require the use of a replaceable filter element, thus minimizing maintenance requirements. This invention recognizes that the filtration requirements for protection of the transfer pump are less stringent than that for the fuel injection pump where extremely minute particulates and water can cause serious damage. The primary filter according to this invention also incorporates a means for removing trapped water and heavy particulates which precipitate out of the fuel and collect in the lower portion of the filter due to their relatively higher density. Such a feature is particularly advantageous where a water separator unit is used on the pressure side of the fuel delivery system. Water separation on the pressure side of the system tends to be more difficult. Water removed by the primary filter reduces water removal requirements of the downstream water separator. As additional refinements, the primary filter according to this invention may also incorporate a magnetic probe which attracts and retains magnetic particles suspended within the fuel. In addition, a relatively coarse particulate filter can be provided which preferably includes a bypass feature to allow wax deposits to pass through the filter which might be present in cold weather operating conditions. Wax flowing through the filter can be reduced downstream through the agitation and shearing action of the transfer pump and through heat applied by a fuel heating device (if provided). The filtration operation of the filter is provided by decreasing the velocity of the fuel to allow particulates and water to settle out, and also by causing the fuel to undergo an abrupt change in direction which also aids in separating out particulates and relatively high density contaminants such as water.

Additional benefits and advantages of the present invention will become apparent to those skilled in the art to which this invention relates from the subject description of the preferred embodiments and the appended claims, taken in conjunction with the accompanying drawings.

BRIEF DESCRIPTION OF THE DRAWINGS

FIG. 4 is a partial cross-sectional and partial pictorial view showing the particulate filter for the primary filter shown in FIGS. 2 and 3 in a normal condition filtering fuel.

FIG. 5 is a partial cross-sectional and partial pictorial view of the particulate filter shown in FIGS. 2 and 3, shown in a deflected bypassing condition.

FIG. 6 is a pictorial view of a representative fuel supply system having a primary fuel filter according to this invention.

DETAILED DESCRIPTION OF THE INVENTION

Figure 1:
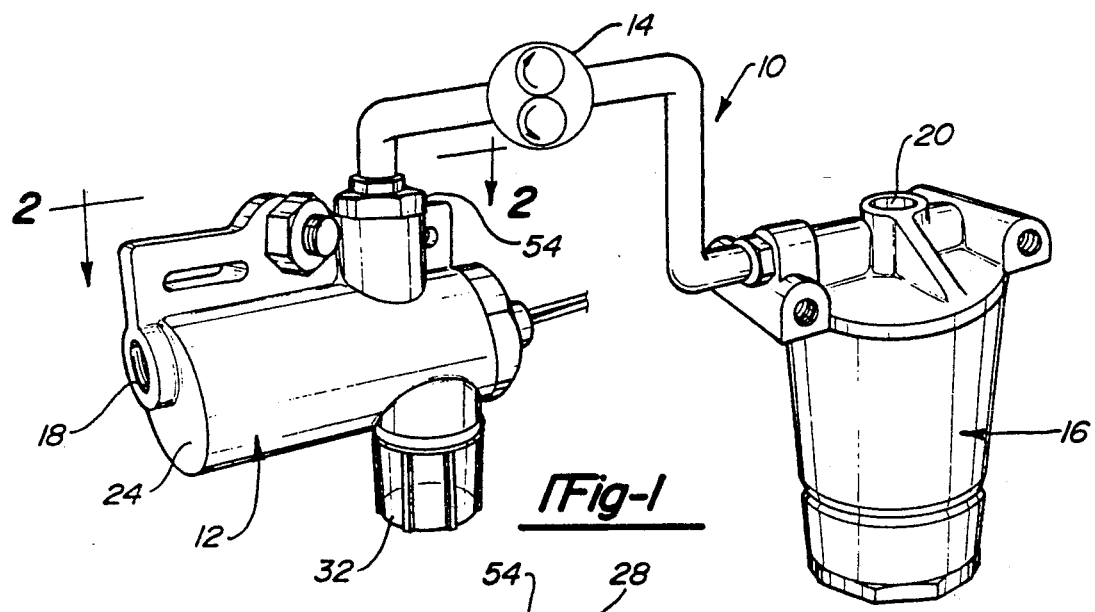
FIG. 1 is a pictorial view of a representative fuel supply circuit incorporating a primary filter according to this invention.

A representative fuel supply system according to this invention for a motor vehicle is shown pictorially in FIG. 1 and is generally designated by reference number 10. Fuel supply system 10 includes primary filter 12, transfer pump 14 (represented diagrammatically), fuel conditioning unit 16, and conduits for connecting these components together. Fuel from a fuel tank (not shown) enters primary filter 12 at inlet port 18 and is drawn to transfer pump 14 under suction. After passing through transfer pump 14, the fuel moves through fuel conditioning unit 16 and is delivered to outlet 20, and then flows to a fuel injection pump (not shown). As previously detailed, the function of primary filter 12 is to remove large and/or heavy particulates and other contaminants from fuel to provide protection for transfer pump 14, which is typically a positive displacement type such as a gear pump which are sensitive to contamination. Fuel conditioning unit 16 is an optional item for the fuel supply circuit and could be replaced by a conventional particulate filter. The fuel conditioning unit 16 shown in FIG. 1 is of a type described in applicant's U.S. Pat. Nos. 4,680,110 and 4,676,895.

Figure 2:
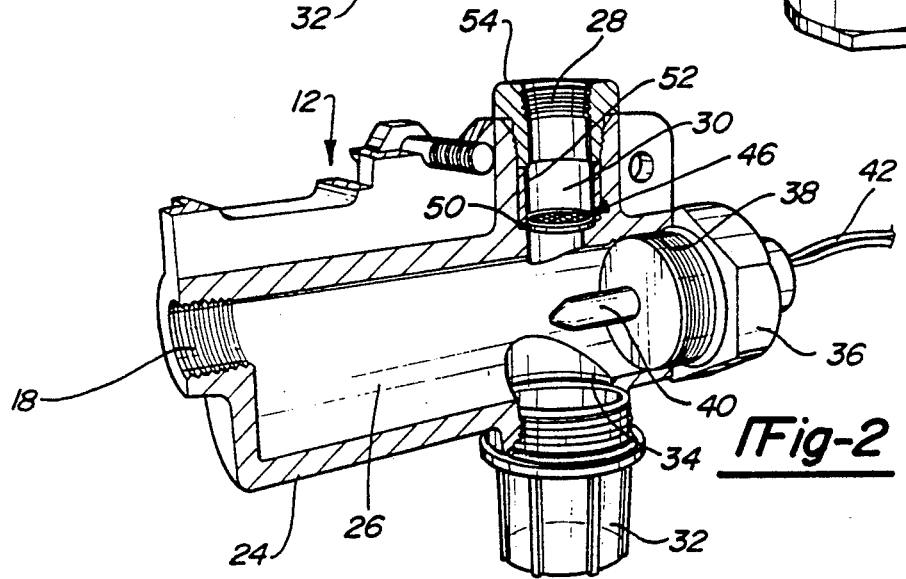
FIG. 2 is a partial cross-sectional and partial pictorial view of a primary filter in accordance with a first embodiment of this invention incorporating an electromagnet and a removable contaminant collection bowl.

FIG. 2 is a partial cross-sectional view showing the internal configuration of primary filter 12 in accordance with a first embodiment of this invention. Primary filter housing 24 defines inlet port 18 and has an elongated substantially cylindrical interior cavity 26. Outlet port 28 opens at the top of housing 24 and communicates with vertically oriented outlet passage 30. Inlet port 18 is preferably positioned so that the fuel enters in an upper area of one end of cavity 26, as shown in FIG. 2. Cavity 26 has a cross-sectional area which is substantially greater than that of inlet port 18 and the conduits drawing fuel from the fuel tank (not shown). A contaminant collection cup 32 is threaded into collector port 34. Collection cup 32 gathers relatively heavy contaminants from the fuel and can be removed periodically for emptying. Preferably, collection cup 32 is made of a transparent material to enable convenient visual inspection of the contaminants collected. Magnet plug 36 is threaded into plug port 38 and is positioned at the opposite end of cavity 26 from inlet port 18. For this embodiment, magnet plug 36 incorporates an electromagnet 40 with leads 42 for supplying electrical power to the electromagnet. Electromagnet 40 attracts magnetic particles entrained within the fuel flowing through primary filter 12, thus trapping them and preventing their transmission to transfer pump 14.

Now with particular reference to FIGS. 4 and 5, particulate filter element 46 is shown in detail. Filter element 46 is positioned within outlet passage 30 and is provided for preventing the transmission of large particulates. Particulate filter element 46 includes an outer support ring 48 which is trapped between a shoulder 50 formed by the housing and bushing 52. Outlet port 28 is formed by fitting 54 which threads into the housing and traps bushing 52 in place. Filter mesh 56 is supported by inner ring 58 which is attached to support ring 48 by a pair of supports 60. Rings 50 and 58, and supports 60 are preferably formed integrally from an elastomeric material, for example, by injection molding.

Operation of primary filter 12 will now be explained with particular reference to FIGS. 2, 4 and 5. Fuel entering inlet port 18 undergoes a decrease in velocity due to the relatively large cross-sectional area of cavity 26. This action tends to allow heavy contaminants (i.e., density greater than fuel) to "settle out" from the fuel such that it collects in the lower portion of cavity 26. These contaminants gather in collection cup 32 for subsequent disposal. The orientation of outlet passage 30 further enhances the particulate separation effect since the fuel must undergo a 90 degree turn in direction which tends to eject heavy contaminants through centrifugal action. Electromagnet 40 is preferably energized through the engine electrical circuit of the associated motor vehicle such that once engine operation ceases, the current applied to electromagnet 40 is stopped, causing the magnetic particles to be dropped from the electromagnet into collection cup 32.

FIG. 4 shows the normal condition of particulate filter element 46 in which fuel flowing through primary filter 12 must pass through the filter element such that large particulates are trapped. In conditions where there is significant paraffin formation or ice particles within the fuel, it is desirable to prevent plugging of filter element 46 since these solids can be broken down through the shearing action of transfer pump 14 or melted by fuel conditioning device 16. Accordingly, when mesh 56 becomes clogged due to such formations, ring 58 deflects as shown in FIG. 5 in a "butterfly" action to allow bypass once a predetermined pressure differential occurs across filter element 46. Since primary filter 12 does not use a disposable filter element, it is essentially a permanent filter requiring regular maintenance only for the purpose of removing contaminants trapped within collection cup 32.

Figure 3:
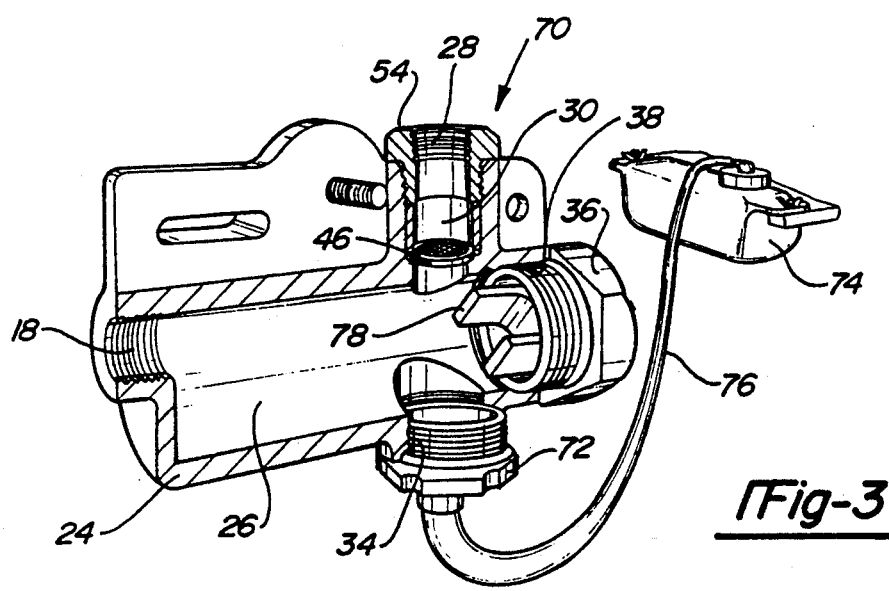
FIG. 3 is a partial cross-sectional and partial pictorial view of a primary filter in accordance with a second embodiment of this invention utilizing a permanent magnet and a remote contaminant collection reservoir.

Now with reference to FIG. 3, a second embodiment of a primary filter according to this invention is shown which is generally designated by reference number 70. Primary filter 70 differs from primary filter 12 only with respect to the contaminant collection system and the type of magnet used for attracting magnetic particles. Accordingly, all common elements of primary filter 70 and primary filter 12 are identified by like reference numbers. For the embodiment shown in FIG. 3, a collection cap 72 is threaded into collection port 34. Contaminants collecting within cap 72 are transferred to collection tank 74 through tube 76. Naturally, collection tank is positioned lower than cap 72 to receive the contaminants. The advantages of this configuration include the larger capacity of collection tank 74 and the fact that such a vessel can be mounted in any convenient location without requiring convenient access to primary filter 12. Another distinguishing feature of primary filter 70 is the provision of a permanent magnet 78 in the place of an electromagnet. Permanent magnet 78 offers the advantage that electrical wiring is not required but would not automatically "dump" contaminants once the engine is shut down. Accordingly, for this embodiment, it would be a recommended maintenance procedure to periodically remove magnet plug 36 to clean permanent magnet 78. In all other respects, primary filter 70 operates in a manner identical to that of primary filter 12.

FIG. 6 is provided to show a representative installation of primary filter 12 in a vehicle. FIG. 6 shows transfer pump 14 in accordance with one currently available design and fuel conditioning device 80 which differs from the configuration shown in FIG. 1. Primary filter 12 is designed to be readily adapted to existing fastening posts 82 of a vehicle such as shown in FIG. 6. The installation shown in FIG. 6 allows primary filter 12 to replace a particulate filter (not shown) which would be mounted using the same fasteners which are ordinarily used for mounting the primary filter. For the installation shown in FIG. 6, fuel is introduced to primary filter 12 through line 84 from the fuel tank. Lines 86 and 88 transmit fuel to and from transfer pump 14, respectively. Clean fuel is thereafter transmitted to the fuel injection pump of the associated engine through line 90.

While the above description constitutes the preferred embodiments of the present invention, it will be appreciated that the invention is susceptible of modification, variation and change without departing from the proper scope and fair meaning of the accompanying claims.

I claim:

1. A fuel supply system for a motor vehicle engine comprising:

a fuel tank;

a transfer pump for drawing fuel from said fuel tank and supplying said fuel under pressure to said motor vehicle engine;

a primary filter positioned for filtering fuel between said fuel tank and said transfer pump, said primary filter having a horizontally elongated housing having a sidewall and first and second ends defining an internal cavity with an inlet port positioned at said first end of said internal cavity, said internal cavity having a longitudinal axis and a vertically disposed cross-sectional area oriented perpendicularly to said longitudinal axis, said cross-sectional area being greater than the area of said inlet port whereby fuel flowing through said housing undergoes a decrease in velocity upon entering said housing, said primary filter including a primary filtration element of a permanent nature for normally providing full fuel flow filtration, said inlet port defining an inlet axis generally parallel with the longitudinal axis of said horizontally elongated housing;

collection means in said sidewall adjacent said second end for capturing impurities from said fuel, said collection means being connected to a vessel remotely mounted from said primary filter by a conduit;

an outlet port in said sidewall adjacent said second end of said internal cavity opposite said first end and drawing fuel from an upper area of said internal cavity wherein said fuel enters into said housing at said inlet port and travels directly through said housing to said second end and out of said internal cavity through said outlet port, said outlet port being located on a side of said housing opposite that of the collection means and defining an outlet axis generally perpendicular to said longitudinal axis of aid horizontally elongated housing for creating an abrupt change in fuel flow direction to aid in separating out particulate and relatively high density contaminants, said outlet port communicating with said internal cavity through a reduced area passage, said reduced area passage having a cross-sectional area smaller than said vertically disposed cross-sectional area of said horizontally elongated housing, said primary filtration element disposed within said reduced area passage; and a secondary filter for filtering fuel between said transfer pump and said motor vehicle engine.

2. A filter device for a fuel supply system of a combustion apparatus for removing impurities from fuel comprising:

a horizontally elongated housing having first and second ends defining an internal cavity with an inlet port positioned at said first end of said internal cavity;

collection means for capturing impurities from said fuel positioned in a lower portion of said internal cavity;

an outlet port communicating with said internal cavity adjacent said second end of said internal cavity opposite said first end; and a particulate filter element within said housing wherein said particulate filter element includes bypass means for allowing fuel to bypass said particulate filter element in response to a pressure differential wherein said particulate filter element deflects from a first position where said fuel passes through said particulate filter element to a second deflected position where said fuel is allowed to bypass said particulate filter element.

3. A filter device for a fuel supply system of a combustion apparatus for removing impurities from fuel comprising:

a horizontally elongated housing having first and second ends defining an internal cavity with an inlet port positioned at said first end of said internal cavity;

collection means for capturing impurities from said fuel positioned in a lower portion of said internal cavity;

an outlet port communicating with said internal cavity adjacent said second end of said internal cavity opposite said first end; and a particulate filter element within said housing wherein said particulate filter element includes bypass means for allowing fuel to bypass said particulate filter element in response to a pressure differential wherein said particulate filter element deflects from a first position where said fuel passes through said particulate filter element to a second deflected position where said fuel is allowed to bypass said particulate filter element, said particulate filter element including a flexible ring supporting a filter mesh, said flexible ring deflectable in response to said pressure differential.

4. A fuel supply system for a motor vehicle engine comprising:

a fuel tank;

a transfer pump for drawing fuel from said fuel tank and supplying said fuel under pressure to said motor vehicle engine;

a primary filter positioned for filtering fuel between said fuel tank and said transfer pump, said primary filter having a horizontally elongated housing having first and second ends defining an internal cavity with an inlet port positioned at said first end of said internal cavity;

collection means for capturing impurities from said fuel positioned in a lower portion of said internal cavity;

an outlet port communicating with said internal cavity adjacent said second end of said internal cavity opposite said first end;

a particulate filter element within said housing wherein said particulate filter element includes bypass means for allowing fuel to bypass said particulate filter element in response to a pressure differential wherein said particulate filter element deflects from a first position where said fuel passes through said particulate filter element to a second deflected position where said fuel is allowed to bypass said particulate filter element; and a secondary filter for filtering fuel between said transfer pump and said motor vehicle engine.

5. A filter device for a fuel supply system of a combustion apparatus for removing impurities from fuel comprising:

a horizontally elongated housing having a sidewall and first and second ends defining an internal cavity with an inlet port positioned at said first end of said internal cavity, said internal cavity having a longitudinal axis and a vertically disposed cross-sectional area oriented perpendicularly to said longitudinal axis, said cross-sectional area being greater than the area of said inlet port whereby fuel flowing through said housing undergoes a decrease in velocity upon entering said housing;

collection means for capturing impurities from said fuel positioned in said sidewall adjacent said second end;

an outlet port in said sidewall adjacent said second end of said internal cavity opposite said first end and drawing fuel from an upper area of said internal cavity wherein said fuel enters said housing at said inlet port and travels directly through said housing to said second end and out of said internal cavity through said outlet port, said collection means being located on a side of said housing opposite that of said outlet port; and a magnet positioned at said second end of said internal cavity for attracting and retaining magnetic particles carried into said housing by said fuel.

* * * * *

UNITED STATES PATENT AND TRADEMARK OFFICE
CERTIFICATE OF CORRECTION

PATENT NO. : 5,174,892

DATED : December 29, 1992

INVENTOR(S) : Leland L. Davis

It is certified that error appears in the above-identified patent and that said Letters Patent is hereby corrected as shown below:

On the title page, in the designation of the Assignee, please delete "Daco" and insert --Davco--.

Signed and Sealed this

Fifteenth Day of February, 1994

Attest:

BRUCE LEHMAN

Attesting Officer

Commissioner of Patents and Trademarks